United States Patent
Barry et al.

(10) Patent No.: US 6,621,434 B2
(45) Date of Patent: Sep. 16, 2003

(54) METHOD FOR CONVERTING A PLURALITY OF SIGNALS FROM ONE OF A DIGITAL AND ANALOGUE FORM TO THE OTHER FORM

(75) Inventors: Joseph Michael Barry, Rossbrien (IE); Martin Gerard Cotter, Ennis (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/166,439

(22) Filed: Jun. 10, 2002

(65) Prior Publication Data

US 2003/0052804 A1 Mar. 20, 2003

Related U.S. Application Data

(60) Provisional application No. 60/297,408, filed on Jun. 11, 2001.

(51) Int. Cl.[7] .................................................. H03M 1/00
(52) U.S. Cl. ....................... 341/141; 341/143; 341/144; 375/240.01; 375/240.02
(58) Field of Search .................................. 341/143, 141; 375/242, 147, 240.01, 240.02; 370/369, 503; 386/55, 111, 64

(56) References Cited

U.S. PATENT DOCUMENTS

| | | | | |
|---|---|---|---|---|
| 5,526,051 A | * | 6/1996 | Gove et al. | 375/240.01 |
| 5,982,819 A | * | 11/1999 | Womack et al. | 375/316 |
| 6,038,256 A | * | 3/2000 | Linzer et al. | 375/240.12 |
| 6,061,404 A | * | 5/2000 | Yonemitsu et al. | 375/242 |
| 6,185,229 B1 | * | 2/2001 | Obikane et al. | 370/537 |
| 6,188,703 B1 | * | 2/2001 | Dobson et al. | 370/537 |
| 6,215,423 B1 | * | 4/2001 | May et al. | 341/143 |
| 6,285,717 B1 | * | 9/2001 | Bahng et al. | 375/240.29 |
| 6,507,673 B1 | * | 1/2003 | Wang et al. | 382/236 |
| 6,516,029 B1 | * | 2/2003 | Wang | 375/240.01 |

* cited by examiner

Primary Examiner—Michael Tokar
Assistant Examiner—Lam Mai
(74) Attorney, Agent, or Firm—Iandioro & Teska

(57) ABSTRACT

A method for selectively and sequentially converting digital video data signals in three formats, namely, standard definition, progressive scan and high definition formats to analogue form such that the same analogue reconstruction filter can be used for filtering the analogue forms of the signals after conversion. The digital signals prior to being converted are over-sampled at respective over-sampling frequencies for displacing image frequencies to frequencies sufficiently spaced apart from the widest band width signal so that the analogue reconstruction filter can be provided for filtering the widest band width signal as well as the other band width signals and also can be provided with a relatively low roll-off rate of attenuation. The standard definition video data signals are over-sampled at eight times the nyquist sampling frequency, and the progressive scan signals are over-sampled at four times the nyquist sampling frequency, thus displacing image frequencies of the standard definition and progressive scan signals to 108 MHz, so that the centre frequency of the image frequency is displaced to 108 MHz. The high definition video signals are over-sampled at twice the nyquist sampling frequency, thus displacing the image frequency of the high definition signal to 148.5 MHz, so that its centre frequency is displaced to 148.5 MHz. This, thus, leaves a frequency band gap of approximately 66 MHz between the high definition band width signal and the closest image frequency, namely, that of the progressive scan signal. The method can also be applied to the conversion of analogue video signals to digital form whereby the same analogue anti-aliasing filter can be used for the analogue signals in the three formats.

23 Claims, 3 Drawing Sheets

METHOD FOR CONVERTING A PLURALITY OF SIGNALS FROM ONE OF A DIGITAL AND ANALOGUE FORM TO THE OTHER FORM

This application claims benefit of U.S. provisional application No. 60/297,408 filed Jun. 11, 2001.

FIELD OF THE INVENTION

The present invention relates to a method for selectively and sequentially converting a plurality of signals from one of a digital and analogue form to the other of the digital and analogue form, wherein the signals are of different frequency band widths, so that the signals can be filtered in the same analogue filter in a common analogue path.

BACKGROUND TO THE INVENTION

Digital video data signals are provided in three commonly used formats, namely, standard definition format, progressive scan format and high definition format. In standard definition format they may be provided in accordance with any of the following standards, PAL, NTSC and SECAM standards, in progressive scan format they may be provided in accordance with 525P and 625P standards, and in high definition they may be provided in accordance with 1080i, 720P and 1250i standards. In general, it is desirable that video signal processing units be capable of processing the video data signals in all three formats. Standard definition format video data signals, in general, are typically of band width of 6 MHz. Progressive scan format video data signals are typically of band width of 12 MHz, while high definition format video data signals are typically of band width of 30 MHz. In general, when being converted from digital form to analogue form, standard definition format video data signals are generally sampled at an over-sampling frequency of between 24 MHz and 29.5 MHz, and typically, at approximately 27 MHz, which is approximately twice the nyquist sampling frequency. Progressive scan format video data signals when being converted to analogue form are sampled generally at a sampling frequency of 24 MHz to 38 MHz, and most commonly at a sampling frequency of approximately 27 MHz, which is approximately the nyquist sampling frequency. High definition format video data signals when being converted to analogue form are sampled at a sampling frequency in the range of 70 MHz to 85 MHz and most commonly at a frequency of approximately 74.25 MHz, which is approximately the nyquist sampling frequency.

At these sampling frequencies, in the conversion of video digital signals in digital form to analogue form, in general, separate analogue reconstruction filters are required for filtering out image frequencies from the analogue signals of the different formats. Such image frequencies are the resultant of the zero order hold characteristics of a DAC, and hereinafter are referred to as image frequencies. Image frequencies occur at the sampling frequency and at multiples thereof. Thus, at a sampling frequency of 27 MHz the image frequencies of the standard definition and progressive scan video signals occur at the sampling frequency of 27 MHz and multiples thereof. Since the frequency of 27 MHz is within the band width of the high definition video signals, a separate analogue reconstruction filter would be required to filter the standard definition signals and the progressive scan signals on the one hand, and the high definition signals on the other hand. Additionally, since the video data signals of each format can require up to three channels, up to nine separate analogue reconstruction filters may be required for filtering the analogue forms of the video data signals in the respective three formats. Analogue reconstruction filters are in general provided as discrete components. Thus, in general, where the digital to analogue converting circuitry for converting digital video data signals to analogue video signals is implemented as an integrated circuit, an appropriate number of output pins are required for providing output signals in the various formats to the respective analogue reconstruction filters. This significantly increases the pin count of the integrated circuit. Alternatively, relatively complex analogue reconstruction filters are required in which the band pass of the filters can be varied for accommodating the video signals of different formats. Such filters require active components which are relatively complex and thus expensive.

Similarly, when analogue video data signals are converted to digital form separate analogue anti-aliasing filters are required for filtering the analogue signals in the respective formats prior to conversion.

There is therefore a need for a method for converting digital video data signals of respective different frequency band widths to analogue form so that the number of analogue reconstruction filters required is minimised. There is also a need for a method for converting analogue video signals of respective different band widths to digital form so that the number of analogue anti-aliasing filters required is minimised. Indeed, there is a need for a method for converting a plurality of signals in one of a digital and analogue form to the other of the digital and analogue form where the signals are of different frequency band widths which facilitates filtering of the analogue forms of the signals in the same analogue filter.

The present invention is directed towards providing such a method.

SUMMARY OF THE INVENTION

According to the invention there is provided a method for selectively and sequentially converting a plurality of signals of different frequency band width from one of a digital and analogue form to the other of the digital and analogue form, wherein the signals in the analogue form are passed along a common analogue path through an analogue filter, the method comprising the steps of;

sequentially selecting the signals to be converted, sequentially passing the selected signals through a converter circuit for converting the signals from the one of the digital and analogue form to the other of the digital and analogue form, and over-sampling the respective signals in the converter circuit at respective over-sampling frequencies so that the analogue forms of the signals can be filtered in the same analogue filter in the common analogue path.

Preferably, the signal of widest band width is over-sampled at the lowest over sampling rate. Advantageously, the signal of narrowest band width is over-sampled at the highest over-sampling rate. Ideally, the signal of widest band width is over-sampled at a frequency of at least twice the nyquist sampling frequency.

In one embodiment of the invention the signals are digital signals, and the converter circuit is a digital to analogue converter circuit for converting the signals from digital form to analogue form and the analogue filter is a reconstruction filter.

In another embodiment of the invention the over-sampling frequencies for the respective signals are selected such that image frequencies in the analogue signal are sufficiently displaced from the widest frequency band width signal that the image frequencies can be removed from each of the analogue signals by the same analogue filter without affecting the signals. Preferably, the over-sampling frequencies for the respective signals are selected such that the image frequency, the lowest frequency of which is closest to the widest band width signal is displaced from the widest band signal to a frequency at least twice the band width of the widest band width signal.

In another embodiment of the invention the over-sampling frequencies for the respective signals are selected such that the image frequency, the lowest frequency of which is closest to the widest band width signal is displaced from the widest band signal to a frequency at least three times the band width of the widest and width signal.

In a further embodiment of the invention the signals are in analogue form and are converted to digital form, the analogue filter being an anti-aliasing filter.

Preferably, the over-sampling frequencies at which the respective signals are over-sampled are selected such that the analogue anti-aliasing filter can be such as to preserve the signal of widest band width and reject signals of frequencies above the lowest sampling frequency used less the widest band width of the signal sampled at the lowest sampling frequency. Advantageously, unwanted frequencies between the band width of each signal and half the frequency at which it is over-sampled are removed by a combined anti-aliasing filter and decimation fitter.

Preferably, the over-sampling frequencies are selected such that the analogue filter can be provided with a low roll-off rate of attenuation.

In one embodiment of the invention the band width of a first one of the signals is in the range of 4 MHz to 8 MHz, and is over-sampled at a rate of eight times the nyquist sampling frequency.

In another embodiment of the invention the first signal is of band width of approximately 6 MHz In a further embodiment of the invention the band width of a second one of the signals is in the range of 10 MHz to 18 MHz, and is over-sampled at a rate of four times the nyquist sampling frequency.

In a further embodiment of the invention the second signal is of band width of approximately 12 MHz.

In another embodiment of the invention the band width of a third one of the signals is in the range of 25 MHz to 35 MHz, and is over-sampled at a rate of twice the nyquist sampling frequency.

In a further embodiment of the invention the third signal is of band width of approximately 30 MHz.

In one embodiment of the invention the signals are video signals, and may be in any one or more of the following formats, namely, standard definition format, progressive scan format and high definition format.

In one embodiment of the invention the analogue filter is a second or higher order filter.

ADVANTAGES OF THE INVENTION

The advantages of the invention are many. The main advantage of the invention is that a method is provided for converting signals of different band widths from one of a digital and analogue form to the other of the digital and analogue form, which permits the analogue forms of the signals to be filtered in the same analogue filter. This has the particularly important advantage of reducing the number of analogue filters required for filtering the analogue form of the signal, and thus, where the conversion circuitry is implemented as an integrated circuit chip the pin count of each integrated circuit can be reduced. Additionally, the complexity of the analogue filter required, and indeed, the order of the analogue filter required can also be reduced.

This is a particularly important advantage in the processing of video data signals which in general are required to be provided in three formats, namely, standard definition format, progressive scan format and high definition format, each of which are of different band widths, the band width of the standard definition signals being 6 MHz, that of the progressive scan signals being 12 MHz, and the band width of the higher definition signals being 30 MHz. In the conversion of such video signals from digital to analogue form by displacing the image frequencies of the respective format signals to a frequency sufficiently spaced apart from the widest band width signal, namely, the high definition signal, a single analogue reconstruction filter can be used in each of the channels of the video signals, and the single analogue reconstruction filter is suitable for filtering the signals in the corresponding channel of each of the three format signals. In fact, by over-sampling the standard definition signal at eight times the nyquist sampling frequency, and by over-sampling the progressive scan signal at four times the nyquist sampling frequency, and by over-sampling the high definition signal at twice the nyquist sampling frequency, the image frequency of the video signal which is closest to the widest band width signal is that of the progressive scan format signals, and since this is displaced to a central frequency of 108 MHz, the image frequency of the progressive scan signal is displaced 66 MHz from the high definition signal. This, thus, as well as permitting the analogue signals of the three format video signals to be filtered in the same analogue reconstruction filter, also allows the analogue reconstruction filter to be provided with a relatively low roll-off rate of attenuation.

Similar advantages are achieved when the method is applied to converting video data signals in the three formats from analogue form to digital form, and these advantages will be clear from the description of one of the preferred embodiments of the invention which is given below.

Needless to say, the advantages of the method according to the invention as well as being available to the conversion of video signals from digital to analogue form and from analogue to digital form, are also available in the conversion of other types of signals of different frequency band widths from both digital to analogue form and from analogue to digital form.

The invention will be more clearly understood from the following description of some preferred embodiments thereof, which are given by way of example only, with reference to the accompanying drawings.

DETAILED DESCRIPTION OF PREFERRED EMBODIMENTS OF THE INVENTION

Figure 1:
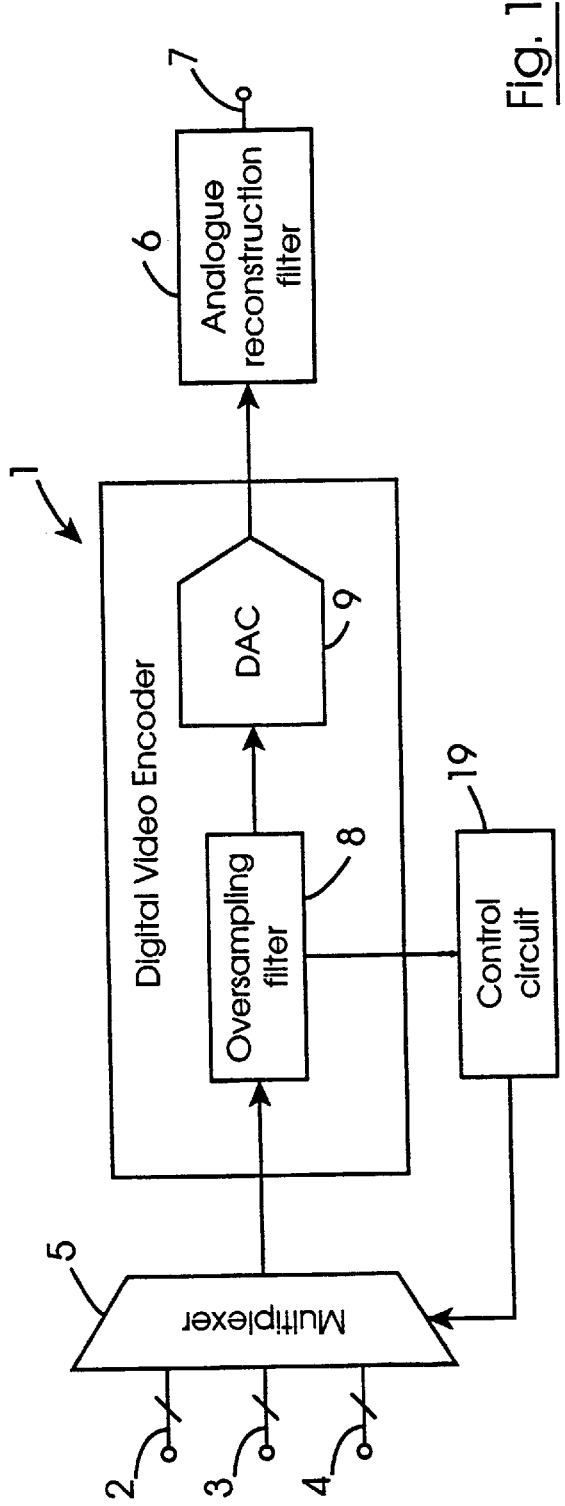
FIG. 1 is a block diagram of a circuit for carrying out a method according to the invention for converting digital video data signals in different formats to analogue form.

Referring to the drawings and initially to FIGS. 1 to 4 thereof, there is illustrated a block representation of a converter circuit indicated generally by the reference numeral 1, for carrying out a method according to the invention for converting a plurality of signals of different band widths from one of digital and analogue form to the other of the digital and analogue form. In this embodiment of the invention the converter circuit 1 is a digital to analogue converter circuit 1 for encoding and converting digital video data signals of three different formats, namely, standard definition format, progressive scan format and high definition format to analogue form. The standard definition format video data signals are applied on a first bus 2, and are of band width of 6 MHz. The progressive scan format video data signals are applied on a second bus 3, and are of band width of 12 MHz, while the high definition format video data signals are applied on a third bus 4, and are of band width of 30 MHz. Since the video data signals of each format may be provided in up to three channels a digital to analogue converter circuit 1 is provided in each channel, however, for convenience only the digital to analogue converter circuit of one of the channels is illustrated and will be described, the other two being similar.

A first multiplexer 5 multiplexes the standard definition, progressive scan and high definition digital video data signals on the first, second and third buses 2, 3 and 4 selectively and sequentially to the digital to analogue converter circuit 1. The signals converted to analogue form are passed through an analogue reconstruction filter 6, and in turn to an output 7. An over-sampling filter 8 in the digital to analogue converter circuit 1 over-samples the digital signals from the first multiplexer 5 at appropriate over-sampling rates so that the image frequencies of the respective signals are sufficiently displaced from the widest band width signal, namely, the high definition format video data signal, so that the analogue form of the video signals can be filtered in the same reconstruction filter 6, and furthermore, that the analogue reconstruction filter 6 can be provided with a relatively low roll-off rate of attenuation. The over-sampled signals from the over-sampling filter 8 are converted to analogue form in a digital to analogue converter (DAC) 9 in the digital to analogue converter circuit 1. The analogue signals from the DAC 9 are relayed to the analogue reconstruction filter 6.

Before describing the over-sampling filter 8 in further detail, the over-sampling rates at which the digital video data signals in the respective formats are over-sampled will first be described with reference to FIG. 4. The widest band width signal is the high definition signal with a band width of 30 MHz, which is represented by graph A in FIG. 4. The normal nyquist sampling frequency of a high definition video signal is 74.25 MHz. In this embodiment of the invention the high definition digital video data signal is sampled at an over-sampling frequency of 148.50 MHz, namely, twice the nyquist sampling frequency, thus displacing the image frequency of the high definition signal which is represented by graph a to a central frequency of 148.5 MHz. The progressive scan format video signal is of band width 12 MHz, and is represented by graph B. The normal nyquist sampling frequency of a progressive scan signal is 27 MHz. In this embodiment of the invention the progressive scan video signal is sampled at an over-sampling frequency of 108 MHz, which is four times the nyquist sampling frequency, thus displacing the image frequency of the progressive scan signal, which is represented by graph b to a central frequency of 108 MHz. The standard definition video signal is of band width of 6 MHz, and is represented by graph C, and is normally sampled at twice the nyquist sampling frequency, namely, at a frequency of 27 MHz. However, in this embodiment of the invention the standard definition video signal is sampled at an over-sampling frequency of 108 MHz, which is eight times the nyquist sampling frequency, thus also displacing the image frequency of the standard definition signal, which is represented by graph c to a central frequency of 108 MHz.

Figure 4:
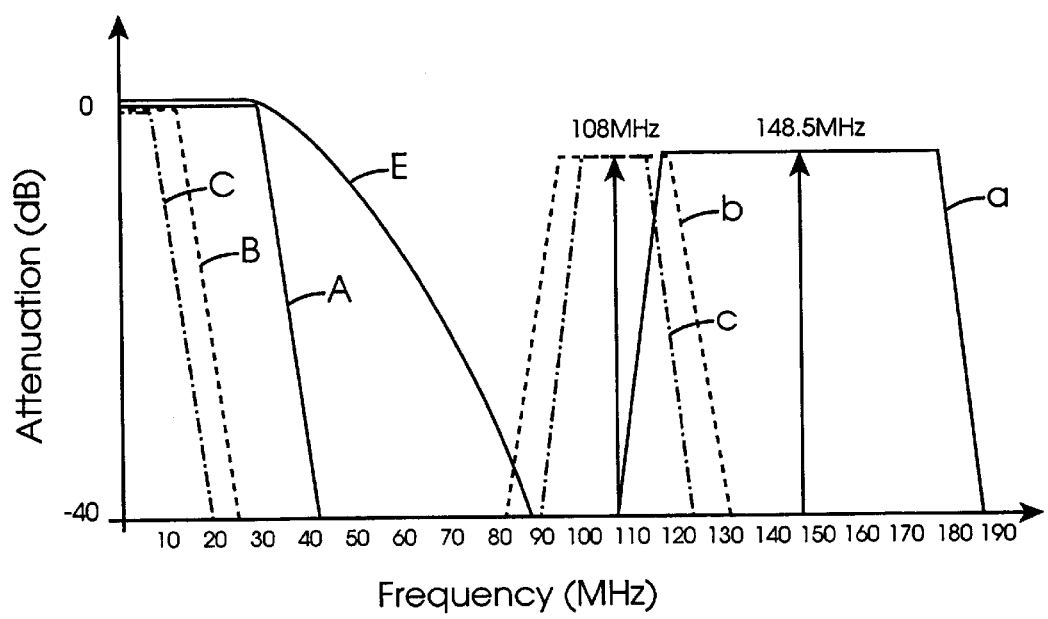
FIG. 4 is a graphical representation of the frequency spectrum of three video data format signals with the graph of FIG. 3 superimposed thereon.

Thus, as can be seen from FIG. 4, the central frequency of the image frequency of the high definition signal appears at 148.5 MHz, and is thus displaced 88.5 MHz from the band width of the widest band width signal, namely, the high definition signal. The image frequency which is closest to the widest frequency band width is the image frequency of the progressive scan video signals the frequency of which appears at 108 MHz. Thus, the closest image frequency to the high definition signal is displaced 66 MHz from the high definition signal. Since the image frequencies of the high definition and standard definition video signals are displaced further than the image frequency of the progressive scan signal, the analogue reconstruction filter 6 can be provided as a low pass reconstruction filter with a band pass of 30 MHz, and a relatively low roll-off rate of attenuation for filtering the image frequencies from the analogue signals of each of the three formats.

Figure 2:
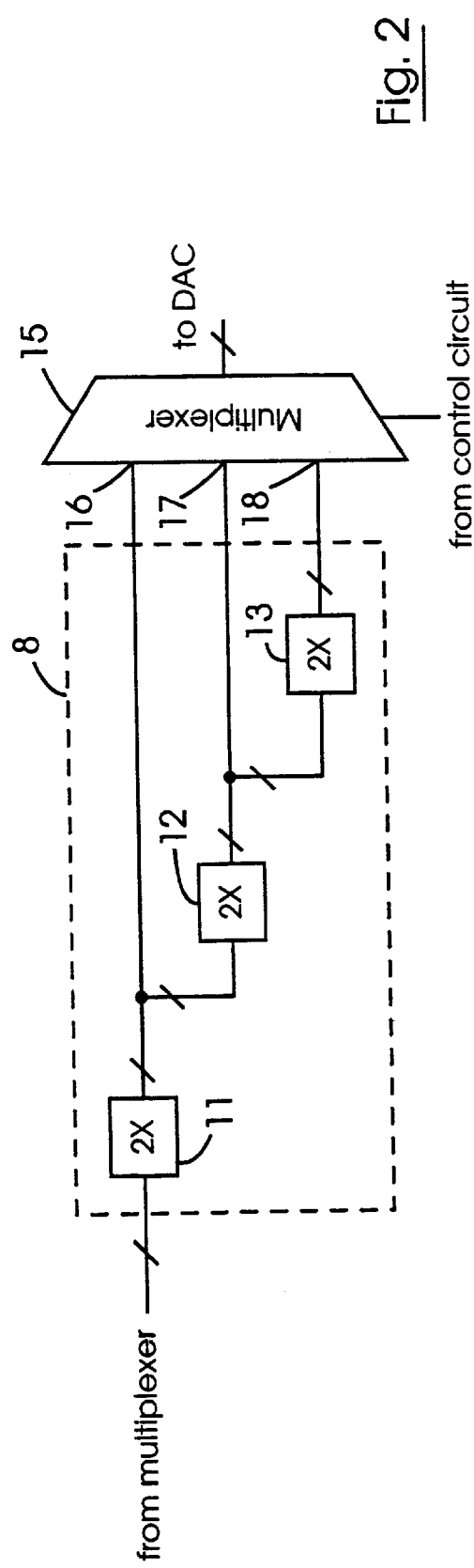
FIG. 2 is a block representation of a portion of the circuit of FIG. 1.

Referring now to FIG. 2, the over-sampling filter 8 will now be described in more detail. The over-sampling filter 8 comprises three interpolating filters, namely, a first interpolating filter 11, a second interpolating filter 12 and a third interpolating filter 13 which are arranged in cascading order. Each of the interpolating filters includes logic which is capable of being clocked within the appropriate sampling clock frequencies. The first interpolating filter 11 has a relatively high roll-off rate of attenuation, and has a high cut-off response and the required level of attenuation at half the sampling frequency in order to preserve as much of the signal as practical. The second and third interpolating filters 12 and 13 are of a lower order than the first filter 11.

The video signals of the three formats are passed through the first filter 11 which can operate at over-sampling frequencies of 27 MHz for over-sampling the standard definition video signal at twice the nyquist sampling frequency. The first interpolating filter 11 is also operable at a sampling frequency of 54 MHz for over-sampling the progressive scan video signals at twice the nyquist sampling frequency, and is operable at 148.5 MHz for over-sampling the high definition video signals at twice the nyquist sampling frequency. The output from the first interpolating filter is applied to a first input 16 of a second multiplexer 15, and also to the input of the second interpolating filter 12. The high definition video signals, since they are only to be over-sampled at twice the nyquist sampling frequency, are multiplexed by the second multiplexer 15 from the first interpolating filter 11 to the DAC 9.

The second interpolating filter 12 is operable, at sampling frequency rates of 108 MHz and 54 MHz for sampling the progressive scan video signals at four times the nyquist sampling frequency, and for sampling the standard definition signals at four times the nyquist sampling frequency. The output from the second interpolating filter 12 is applied to a second input 17 of the second multiplexer 15 and to the third interpolating filter 13. The progressive scan signals are multiplexed from the second input 17 of the second multiplexer 15 to the DAC 9.

The third interpolating filter 13 is operable at a sampling frequency of 108 MHz for over-sampling the standard definition video signals at 108 MHz, which is eight times the nyquist sampling frequency. The over-sampled standard definition video signals are applied to a third input 18 of the second multiplexer 15 which in turn multiplexes the over-sampled standard definition video signals from the third interpolating filter 13 to the DAC 9.

A control circuit 19 operates the first and second multiplexers 5 and 15, respectively for sequentially selecting the video signals in the respective three formats on the first, second and third buses 2, 3 and 4 to be processed through the over-sampling filter 8, and in turn converted in the DAC 9. The control circuit 19 also selectively sets the over-sampling rate of the respective interpolating filters 11, 12 and 13 at the appropriate over-sampling rates. Since the third filter 13 only over-samples the standard definition digital video data signal at 108 MHz the third interpolating filter 13 need only be operable at the over-sampling frequency of 108 MHz.

Figure 3:
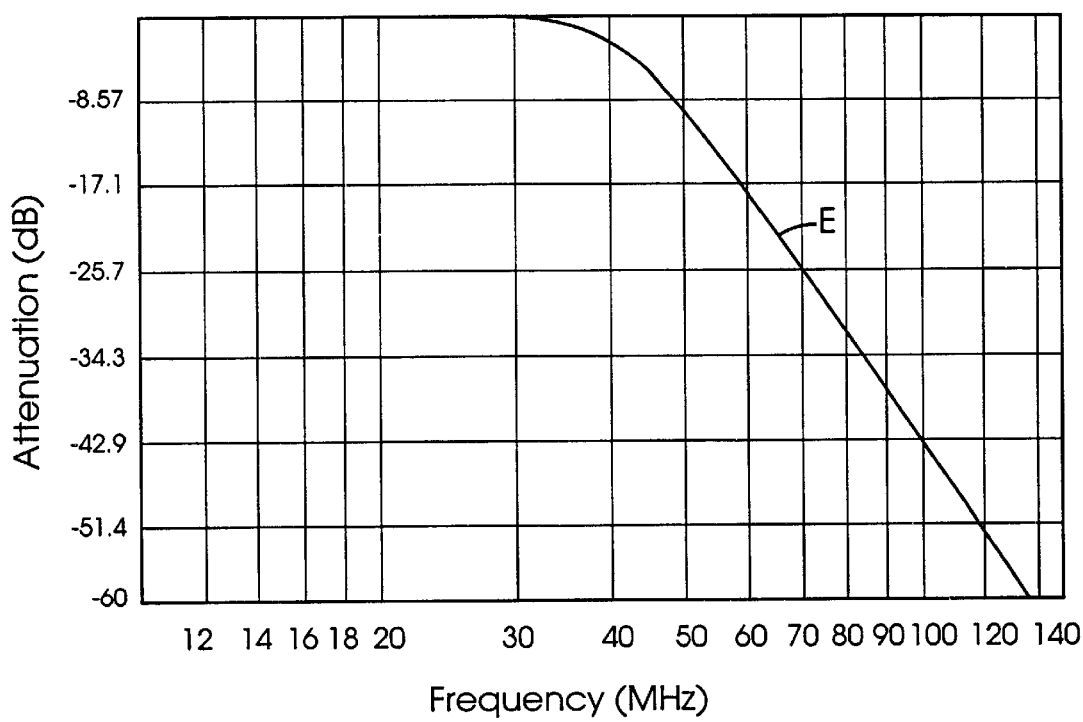
FIG. 3 is a graphical representation of the roll-off rate of an analogue reconstruction filter used in conjunction with the circuit of FIG. 1.

In this embodiment of the invention the analogue reconstruction filter 6 is a sixth order Butterworth filter, the roll-off rate of attenuation characteristic of which is illustrated by the curve E in FIG. 3. Since the widest band width video signal is the high definition video signal at 30 MHz, the analogue filter 6 has a band pass of 30 MHz, and commences to attenuate at a frequency just above 30 MHz. The attenuation falls as a substantially straight line graph to −60 db at a frequency of 140 MHz. At 90 MHz approximately, which is where the lowest frequency of the progressive scan image frequency appears, the attenuation of the analogue filter 6 is approximately −40 db, thus attenuating the closest image frequency by approximately −40 db. The attenuation curve E of the analogue filter 6 is illustrated superimposed on the frequency band width and image frequencies of FIG. 4.

While specific over-sampling frequencies have been described, other suitable over-sampling frequencies for sampling the digital video data signals during conversion may be used, provided that the image frequencies are sufficiently displaced from the video data signal of widest band width to leave a sufficient frequency gap between the lowest frequency of the image frequencies and the highest frequency of the widest band width video signal. Obviously, the greater the frequency gap between the image frequencies and the widest band width signal, the lower the roll-off rate of attenuation of the analogue reconstruction filter which is permissible.

Any suitable digital to analogue converting circuitry may be provided for converting the digital video data signals in the three formats of high definition, progressive scan and standard definition to corresponding analogue signals, and such circuitry will be well known to those skilled in the art. The DAC 9 in the digital to analogue converter circuit 1 may be provided by a current DAC or a voltage DAC. Any other suitable over-sampling filter circuitry besides that described may be used. Such over-sampling filter circuitry will be well known to those skilled in the art.

Figure 5:
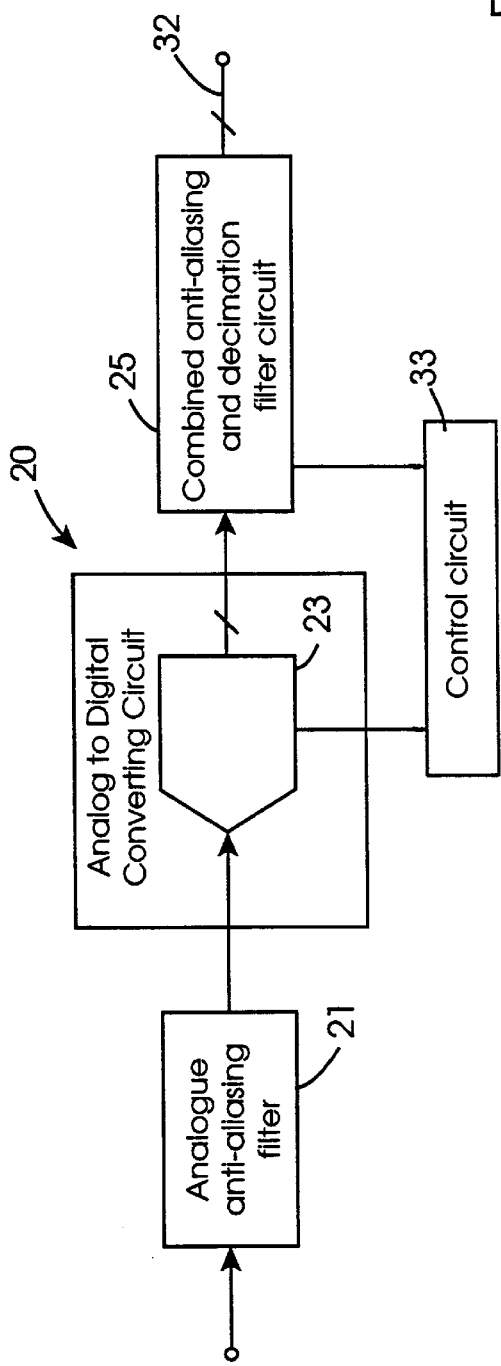
FIG. 5 is a block diagram of a circuit for carrying out a method according to another embodiment of the invention for converting analogue video data signals in different formats to digital form.
Figure 6:
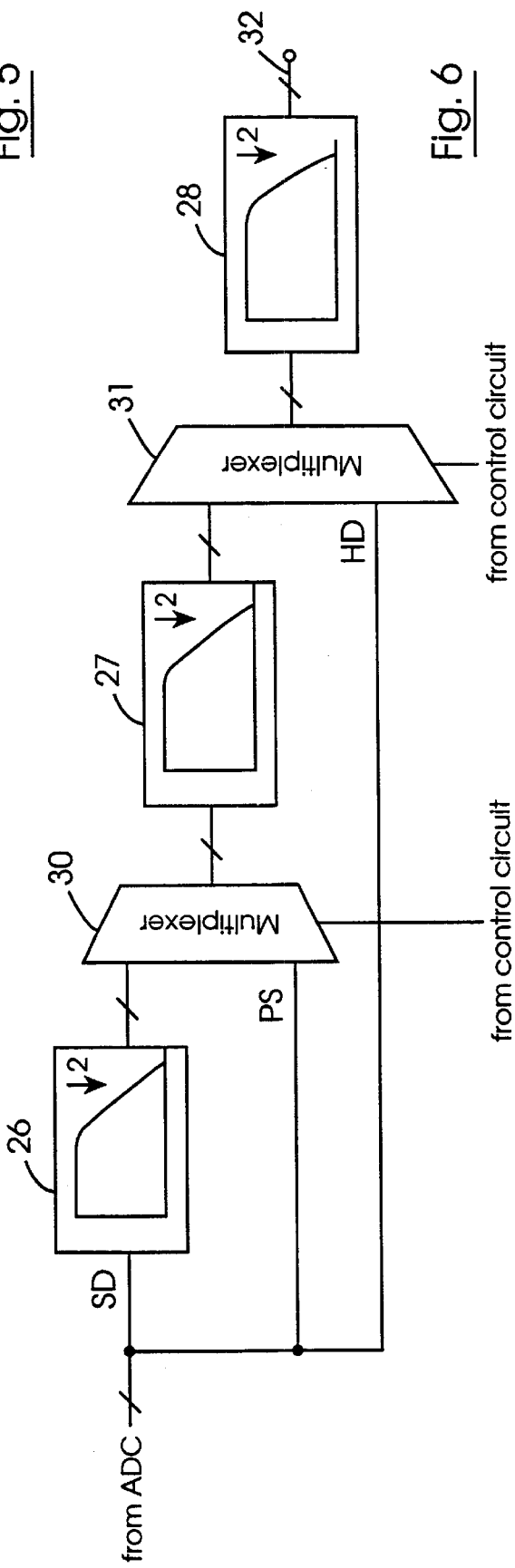
FIG. 6 is a block representation of a portion of the circuit of FIG. 5.

Referring now to FIGS. 5 and 6, there is illustrated an analogue to digital converting circuit, indicated generally by the reference numeral 20, for carrying out a method according to another embodiment of the invention, for converting analogue signals of different frequency band widths to digital signals. In this embodiment of the invention the signals are video signals of high definition format, progressive scan format and standard definition format. Since the video signals in the respective formats may be provided with up to three channels, a separate analogue to digital converting circuit 20 is provided for each channel, however, only one analogue to digital converting circuit 20 is illustrated and described, the other analogue to digital converting circuits being similar. The analogue video signals in the respective three formats are passed through the same analogue filter, which in this embodiment of the invention is an analogue anti-aliasing filter 21, one anti-aliasing filter 21 being provided for each channel of the respective video signals.

The filtered analogue signals from the anti-aliasing filter 21 are applied to the analogue to digital converting circuit 20 where they are over-sampled by an analogue to digital converter (ADC) 23 and converted to digital form. The analogue signals are over-sampled at the same rates as those described for the digital to analogue converting method with reference to FIGS. 1 to 4. In other words, the standard definition signals are over-sampled at eight times the nyquist sampling frequency at 108 MHz. The progressive scan video signals are over-sampled at four times the nyquist sampling frequency at 108 MHz, while the high definition video signals are over-sampled at twice the nyquist sampling frequency at 148.5 MHz. The digital signals from the ADC 23 are passed to a combined anti-aliasing and decimation filtering circuit 25 where unwanted frequency components remaining in the respective signals are filtered out.

By over-sampling the signals at the over-sampling rates of eight times, four times and twice the nyquist sampling frequencies of the standard definition, the progressive scan and the high definition signals, respectively, the analogue anti-aliasing filter can be provided with a band pass of 30 MHz, which thereby preserves the widest band width signal, namely, the high definition signal. Additionally, the analogue anti-aliasing filter 21 can be provided with a relatively low roll-off rate of attenuation since the lowest over-sampling frequency is 108 MHz and the widest band width signal sampled at 108 MHz is the progressive scan signal, thereby leaving a frequency band gap of 66 MHz approximately between the band width of the high definition signal and over-sampling frequency of the progressive scan signal less its band width.

Referring now to FIG. 6, the combined anti-aliasing and decimation filter circuit 25 will now be described. The filter circuit 25 comprises three combined anti-aliasing and decimation filters with respective low pass responses, namely, a first filter 26, a second filter 27 and a third filter 28. Each of the three filters 26, 27 and 28 drop every second sample which they receive. The first combined anti-aliasing and decimation filter 26 filters digital video signals in standard definition format only, and thus can be implemented as a relatively small filter. The digital video signals in standard definition format are applied to the first filter 26 at the over-sampling frequency of 108 MHz, and are outputted at a frequency of 54 MHz. A first multiplexer 30 multiplexes the output from the first filter 26 to the second combined anti-aliasing and decimation filter 27 which is a medium sized filter. The multiplexer 30 also multiplexes the progressive scan signals which are received at 108 MHz to the second filter 27. The second filter 27 is capable of operating at frequencies of 54 MHz and 108 MHz. The outputted filtered digital signals from the second decimation filter 27 are multiplexed through a second multiplexer 31 to the third combined anti-aliasing and decimation filter 28. The standard definition digital signals are outputted from the second filter 27 at a frequency of 27 MHz, while the progressive scan signals which are applied to the second filter 27 at a frequency of 108 MHz are outputted at a frequency of 54 MHz. The second multiplexer 31 also multiplexes the high definition digital video signals at the over-sampling frequency of 148.5 MHz to the third filter 28. The third filter 28 is a relatively large filter and outputs the high definition video signals at the nyquist sampling frequency of 74.25 MHz, the progressive scan signals at the nyquist sampling frequency of 27 MHz and the standard definition video signals at the nyquist sampling frequency of 13.5 MHz, on an output bus 32. A control circuit 33 controls the operation of the ADC 23 and the operation of the first and second multiplexers 30 and 31.

The third filter 28 is provided with a relatively sharp roll-off rate of attenuation and removes unwanted frequency components from the digital signals in the band width 6 MHz to 30 MHz. The second filter 27 has a lower roll-off rate of attenuation than the third filter 28 and removes unwanted frequency components in the frequency range 13.5 MHz to 42 MHz. The first filter 26 has a relatively low roll-off rate of attenuation and removes unwanted frequency components in the frequency range 27 MHz to 102 MHz. Thus, by appropriately over-sampling the signals in each of the three formats, the use of a single analogue anti-aliasing filter with a low band pass of 30 MHz and a relatively low roll-off rate of attenuation for filtering the analogue form of the video signals in the three formats is permitted.

In this embodiment of the invention the analogue anti-aliasing filter 21 is a low pass Butterworth anti-aliasing filter, similar to the analogue reconstruction filter of the converter circuit 1 described with reference to FIGS. 1 to 4.

What is claimed is:

1. A method for selectively and sequentially converting a plurality of signals of different frequency band width from one of a digital and analogue form to the other of the digital and analogue form, wherein the signals in the analogue form are passed along a common analogue path through an analogue filter, the method comprising the steps of:

sequentially selecting the signals to be converted, sequentially passing the selected signals through a converter circuit for converting the signals from the one of the digital and analogue form to the other of the digital and analogue form, and over-sampling the respective signals in the converter circuit at respective over-sampling frequencies so that the analogue forms of the signals can be filtered in the same analogue filter in the common analogue path.

2. A method as claimed in claim 1 in which the signal of widest band width is over-sampled at the lowest over-sampling rate.

3. A method as claimed in claim 1 in which the signal of narrowest band width is over-sampled at the highest over-sampling rate.

4. A method as claimed in claim 1 in which the signal of widest band width is over-sampled at a frequency of at least twice the nyquist sampling frequency.

5. A method as claimed in claim 1 in which the signals are digital signals, and the converter circuit is a digital to analogue converter circuit for converting the signals from digital form to analogue form and the analogue filter is a reconstruction filter.

6. A method as claimed in claim 5 in which the over-sampling frequencies for the respective signals are selected such that image frequencies in the analogue signal are sufficiently displaced from the widest frequency band width signal that the image frequencies can be removed from each of the analogue signals by the same analogue filter without affecting the signals.

7. A method as claimed in claim 6 in which the over-sampling frequencies for the respective signals are selected such that the image frequency, the lowest frequency of which is closest to the widest band width signal is displaced from the widest band signal to a frequency at least twice the band width of the widest band width signal.

8. A method as claimed in claim 6 in which the over-sampling frequencies for the respective signals are selected such that the image frequency, the lowest frequency of which is closest to the widest band width signal is displaced from the widest band signal to a frequency at least three times the band width of the widest and width signal.

9. A method as claimed in claim 1 in which the signals are in analogue form and are converted to digital form, the analogue filter being an anti-aliasing filter.

10. A method as claimed in claim 9 in which the over-sampling frequencies at which the respective signals are over-sampled are selected such that the analogue anti-aliasing filter can be such as to preserve the signal of widest band width and reject signals of frequencies above the lowest sampling frequency used less the widest band width of the signal sampled at the lowest sampling frequency.

11. A method as claimed in claim 10 in which unwanted frequencies between the band width of each signal and half the frequency at which it is over-sampled are removed by a combined anti-aliasing filter and decimation filter.

12. A method as claimed in claim 1 in which the over-sampling frequencies are selected such that the analogue filter can be provided with a low roll-off rate of attenuation.

13. A method as claimed in claim 1 in which the band width of a first one of the signals is in the range of 4 MHz to 8 MHz, and is over-sampled at a rate of eight times the nyquist sampling frequency.

14. A method as claimed in claim 13 in which the first signal is of band width of approximately 6 MHz.

15. A method as claimed in claim 1 in which the band width of a second one of the signals is in the range of 10 MHz to 18 MHz, and is over-sampled at a rate of four times the nyquist sampling frequency.

16. A method as claimed in claim 15 in which the second signal is of band width of approximately 12 MHz.

17. A method as claimed in claim 1 in which the band width of a third one of the signals is in the range of 25 MHz to 35 MHz, and is over-sampled at a rate of twice the nyquist sampling frequency.

18. A method as claimed in claim 17 in which the third signal is of band width of approximately 30 MHz.

19. A method as claimed in claim 1 in which the signals are video signals.

20. A method as claimed in claim 19 in which the first signal is in standard definition format.

21. A method as claimed in claim 19 in which the first signal is in progressive scan format.

22. A method as claimed in claim 19 in which the first signal is in high definition format.

23. A method as claimed in claim 1 in which the analogue filter is a second or higher order filter.

* * * * *